United States Patent [19]
Claar et al.

[11] Patent Number: 4,883,497
[45] Date of Patent: Nov. 28, 1989

[54] FORMATION OF THIN WALLED CERAMIC SOLID OXIDE FUEL CELLS

[75] Inventors: Terry D. Claar, Tisle; Donald E. Busch, Hinsdale; John J. Picciolo, Lockport, all of Ill.

[73] Assignee: Arch Development Corporation, Chicago, Ill.

[21] Appl. No.: 174,146

[22] Filed: Mar. 28, 1988

[51] Int. Cl.$^4$ .............................................. H01M 8/10
[52] U.S. Cl. ...................................... 29/623.5; 429/33; 429/4
[58] Field of Search ........................ 429/32, 33, 34, 12, 429/193; 29/623.1, 623.5; 264/23, 44, 105, 241, 297.4

[56] References Cited

U.S. PATENT DOCUMENTS

| | | | |
|---|---|---|---|
| 4,476,196 | 10/1984 | Poeppel et al. | 429/32 |
| 4,499,663 | 2/1985 | Zwick et al. | 29/623.1 |
| 4,749,632 | 6/1988 | Flandermeyer et al. | 429/12 |

*Primary Examiner*—Anthony Skapars
*Attorney, Agent, or Firm*—Emrich & Dithmar

[57] ABSTRACT

To reduce thermal stress and improve bonding in a high temperature monolithic solid oxide fuel cell (SOFC), intermediate layers are provided between the SOFC's electrodes and electrolyte which are of different compositions. The intermediate layers are comprised of a blend of some of the materials used in the electrode and electrolyte compositions. Particle size is controlled to reduce problems involving differential shrinkage rates of the various layers when the entire structure is fired at a single temperature, while pore formers are provided in the electrolyte layers to be removed during firing for the formation of desired pores in the electrode layers. Each layer includes a binder in the form of a thermosetting acrylic which during initial processing is cured to provide a self-supporting structure with the ceramic components in the green state. A self-supporting corrugated structure is thus formed prior to firing, which the organic components of the binder and plasticizer removed during firing to provide a high strength, high temperature resistant ceramic structure of low weight and density.

22 Claims, 1 Drawing Sheet

FORMATION OF THIN WALLED CERAMIC SOLID OXIDE FUEL CELLS

The United States Government has rights in this invention under Contract No. W-31-109-ENG-38 between the U.S. Department of Energy and Argonne National Laboratory.

BACKGROUND OF THE INVENTION

This invention relates generally to monolithic fuel cells and is particularly directed to the fabrication of multilayered, thin-walled cellular ceramic structures for use in high temperature monolithic solid oxide fuel cells (SOFC).

In monolithic fuel cells, fuel and oxidants are combined electrochemically in a ceramic cell at an operating temperature of 1100°–1300° K. Cell components are fabricated as one piece, much like a block of corrugated paper board. Fuel and oxidants are conducted through alternating passages in the stack, with the passages formed from thin (0.025–0.100 mm) layers of the active cell components: electrolyte (yttria-stabilized zirconia), cathode (strontium-doped lanthanum manganite), anode (nickel-zirconia cermet), and the interconnection material (magnesium-doped lanthanum chromite) that connects cells in electrical series (bipolar plate). The corrugations also form the gas seal at the edges of the structure. Advantage is taken of the ability to fabricate the solid electrolyte and other solid cell components into shapes that cannot be achieved in liquid electrolyte systems. In liquid electrolyte systems, much of the mass and volume goes into building the inert container for the liquid. Eliminating this unnecessary material gives the monolithic fuel cell a significant advantage in performance.

The potential for high power density of the monolithic fuel cell results from the small cell size. Cells 1 to 2 mm in diameter or smaller are achievable when the inert container for electrolyte and inert support for the thin active layers are eliminated. The small cell size increases the active surface area per unit volume of the cell and reduces the voltage losses due to internal electrical resistance. Voltage loss reduction is a significant consideration, because internal resistance is the principle dissipative loss for the ceramic materials and temperatures of interest. Decreasing the cell size decreases the current path length, because current is carried in-plane by the electrodes in the monolithic design.

One solid oxide fuel cell design which shows promise for commercial application is illustrated in FIG. 1. This approach makes use of an SOFC module 10 comprised of alternating layers of anode 16/electrolyte 12/cathode 14 composite which is corrugated, and cathode 14/interconnection 18/anode 16 composite which is flat. Fuel and oxidant flow in alternate sections of the corrugations on opposite sides of the anode/electrolyte/cathode composite. This design provides a high power density because it has high electrolyte surface area per unit volume. However, the manifold arrangement for this design is relatively complex. Another SOFC design illustrated in FIG. 2 includes alternative flat layers of anode/electrolyte/cathode composites and cathode/interconnection/anode composites separated by corrugated anode and cathode layers to provide the fuel and oxidant flow passages. The anode and cathode corrugations are oriented at 90° relative to one another to simplify fuel and oxidant manifold design. The strong, lightweight honeycomb structure of the small cells of this approach are currently being evaluated for space applications and show commercial promise. The small size of these cells and their high output power density makes this approach particularly attractive.

Because this SOFC structure includes various components comprised of different materials in a relatively complex multilayered structure, attempts to fabricate these SOFCs in large scale, commercial type production runs have met with only limited success. Many of the problems encountered are associated with thermal stress and bonding involving thin structures containing different materials with varying physical properties. These problems are primarily exhibited in the form of cracks in the electrolyte and interconnection layers which allow fuel and air to mix and reduce cell performance. The extent of these problems can be reduced by individual firing of the various layers of the SOFC, but this multi-step approach is time consuming, increases the cost of the fuel cells, and is thus of limited commercial utility.

The present invention addresses the aforementioned problems of the prior art by providing an SOFC arrangement and method of fabrication which makes use of intermediate layers having a unique composition between the differing composition of the electrodes and electrolyte which substantially reduces thermal stress and bonding problems during SOFC fabrication. This approach is particularly adapted for single firing at a given temperature of the entire SOFC structure during cell fabrication. The cell structure is self-supporting while in the green state which facilitates the firing process.

OBJECTS AND SUMMARY OF THE INVENTION

Accordingly, it is an object of the present invention to provide a improved method for fabricating solid oxide fuel cells.

It is another object of the present invention to provide an improved process for forming a corrugated structure from a plurality of flexible layers which is self-supporting in the green state and which, upon firing, forms a rigid ceramic structure.

A further object of the present invention is to provide an improved approach for the formation of thin walled ceramic structures having multilayered corrugated walls containing electrodes and an electrolyte or electrodes and a current carrying interconnection.

Another object of the present invention is to co-fire the monolithic array containing four different materials using only one firing schedule while maintaining the desired array configuration and materials microstructures.

Yet another object of the present invention is to form a multilayered, corrugated structure comprised of electrically conductive materials of different compositions which can be subjected to high operating temperatures, e.g., on the order of 1000° C., without cracking, loss of bonding, edge curling or other distortions.

This invention involves a method for forming an SOFC comprising the steps of: dispersing each of four ceramic powders into a respective liquid media so as to form four slips of an anode, a cathode, an electrolyte and an interconnect; milling a binder and a plasticizer into each of the four slips; forming a plurality of the slips into a multi-layer tape including the step of depositing an intermediate bonding layer between adjacent layers, wherein the intermediate layers are comprised of portions of each of the adjacent layers between which the intermediate layer is disposed; forming a plurality of corrugations in the multi-layer tapes, wherein the corrugated stacked array is self-supporting; and heating the stacked array of slips at an elevated temperature so as to increase the density of electrolyte and interconnect layers, form bonds between adjacent slips, and partially sinter and increase the strength of the electrode layers.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings in which are illustrated in simplified schematic diagram form two embodiments of solid oxide fuel cells which the present invention is particularly adapted for fabricating.

DETAILED DESCRIPTION OF PREFERRED EMBODIMENT

Figure 1:
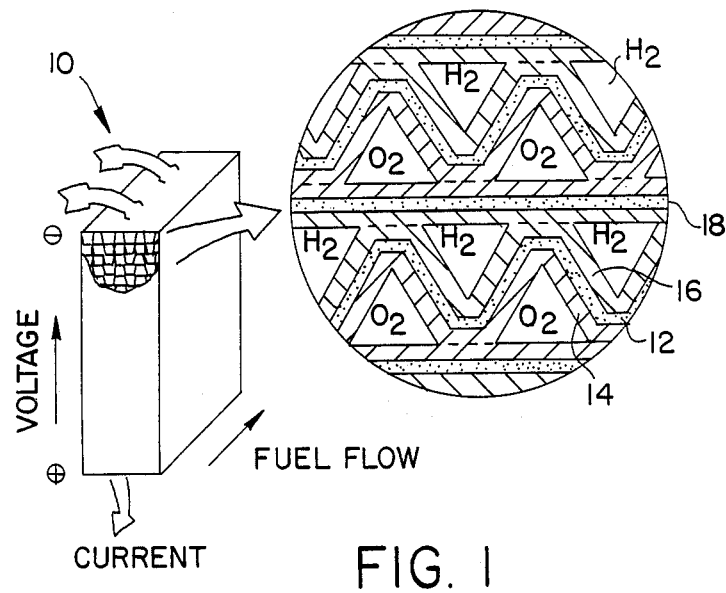
Figure 2:
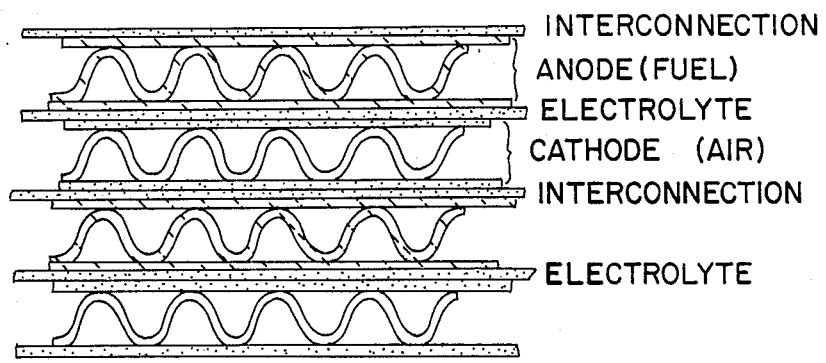

This invention relates to a process for fabricating thin, multilayer tapes of ceramic materials for use in solid oxide fuel cells (SOFCs), forming the appropriate materials into corrugated structures to provide gas flow passages, and layering, bonding, and co-firing the flat and corrugated cell components together to form a monolithic cell array.

SOFC components are currently fabricated by tape casting. Tape casting has been used for many years to form thin, uniform ceramic pieces, particularly in the electronics industry. Tape casting is a process which uses a doctor blade to distribute a dispersed ceramic slip uniformly over a casting surface such as glass. The solvents in the slip are evaporated and the ceramic particles and binder remain in a thin, coherent layer called a tape. An arrangement for fabricating such a monolithic cell array is disclosed in a co-pending application entitled "Monolithic Solid Electrolyte Oxygen Pump," Ser. No. 035,799, filed Apr. 8, 1987.

The fuel cell materials are synthesized as powders, examples of which may include NiO or CoO and yttria-stabilized zirconia (YSZ) as the anode, Sr-doped LaMnO$_3$ as the cathode, yttria-stabilized zirconia (ZrO$_2$ doped with 8-10 mol % Y$_2$O$_3$) as the electrolyte, and Mg-doped LaCrO$_3$ as the interconnection.

Ceramic powders having the appropriate physical and chemical characteristics, i.e., particle size distribution, surface area, morphology, stoichiometry, etc., are dispersed into a liquid medium which may be an organic solvent, a mixture of organic solvents, or water to form a slip. Other additives are also incorporated into the slip including an organic binder, a plasticizer, and a dispersant. The slip is milled to a paint-like consistency using a conventional ball mill or vibratory mill to break up powder agglomerates, to disperse the ceramic particles uniformly within the slip, and to homogenize the binder, plasticizer and dispersant additives. After adequate milling, e.g., for a time in the range of 3-48 hours, the slips are de-aired by ultrasonic agitation and partial evacuation and are then deposited onto an appropriate substrate such as teflon, glass, stainless steel, or other strippable material by either tape casting with a doctor blade or by spraying with a gas pressurized spray gun. Individual layer thicknesses of from 25-250 micrometers are possible using these techniques. After evaporation of the solvent, the thin layers of ceramic have a high degree of physical integrity and substantial flexibility as a result of the binder and plasticizer additives. The flexible ceramic films or tapes can be stripped from the substrates for further processing, such as blanking, corrugating, laminating, etc.

The liquid medium for dispersion of the ceramic powders may consist of a broad range of organic solvents or mixtures thereof including alcohols such as methyl alcohol, ethyl alcohol, butyl alcohol, etc., ketones such as methyl ethyl ketone, methyl isobutyl ketone, etc., chlorinated hydrocarbons such as chloroform, trichloromethane, etc., or hydrocarbon solvents such as xylene, toluene, etc. The organic binders are selected to be compatible with the liquid medium and ceramic particles and are preferably formed from the following classes of materials: acrylics, vinyls, cellulosics, or other film-forming binders. Specific binders that can be used include water-dispersible or organic-soluble acrylics, polyvinyl alcohol, polyvinyl butyral, and polyvinyl chloride. The binder may be either a thermosetting plastic or thermosetting resin. The plasticizer may be such compounds as phthalates, polyethylene glycol, glycerol, etc., depending upon the type of solvent and binder selected.

The flexible ceramic tapes, or films, can be fabricated as a single layer of one cell material or as a multilayer tape consisting of several different cell materials. The monolithic fuel cell array is actually composed of two basic three-layer building blocks. One of these building blocks consists of an anode/electrolyte/cathode (A/E/C) composite, while the other consists of an anode/interconnector/cathode (A/I/C) composite. These three-layer composites can be fabricated using several different procedures such as:

1. Cast single-layer tapes of the anode, electrolyte, cathode and interconnection materials and laminate into three-layer tapes by layering the individual tapes and bonding together by application of heat and pressure or by solvent bonding.
2. Prepare slips of the individual cell materials and co-cast these slips to form an integral three-layer tape.
3. Spray a high-porosity anode layer onto a glass substrate, tape cast a low-porosity electrolyte or interconnection layer over the sprayed anode, and then spray a high-porosity cathode over the electrolyte or interconnection layer.

With any of the three processes mentioned above, one of the objects of this invention is to co-fire the monolithic array containing four different materials using only one firing schedule while maintaining the desired array configuration and materials microstructures. Another object is to achieve low-porosity (<6%) electrolyte and interconnection layers and high-porosity (20-50%) anode and cathode layers after the co-firing step. To accomplish these objectives, it is essential that the particle size distributions and surface areas of the starting ceramic powders and the formulation of the casting and spraying slips be tailored to obtain controlled and uniform firing shrinkages.

In one embodiment of this invention, single layers of anode and cathode tape are formed into corrugations and then layered with alternating flat 3-layer tapes of the types A/E/C and A/I/C. The corrugated anode and cathode structures provide the flow channels (~1 millimeter in size) for passage of the fuel and oxidant gases. The corrugations of anode and cathode material are arranged at 90° orientations relative to one another to facilitate external manifolding of the reactant gases as described in the above-referenced copending patent application.

In another embodiment of this invention, three-layer tapes of the type A/E/C are corrugated to form the gas flow channels. The corrugated A/E/C tapes are bonded with flat three-layer tapes of the A/I/C to form the monolithic fuel cell array. The cell array and gas manifolding arrangement for this embodiment are described in U.S. Pat. Nos. 4,476,197 to Herceg and 4,476,198 to Ackerman et al.

Specific examples of an SOFC fabricated in accordance with the present invention are provided with various of the following features. The anode and cathode layers may be provided with a fugitive pore former as a means of retaining the required interconnected porosity in the fired electrodes. The amount of porosity thus introduced can be controlled by varying the amount of organic pore former formulated into the tape casting or spraying slip approach to SOFC fabrication. The diameter of the pores can be varied over the range 0.5-40 micrometers by selecting the appropriate additives. Examples of acceptable pore formers include graphite, carbon black, rice starch, cornstarch, and other cellulosic derivitives. The pore formers are removed during the firing step by decomposition or oxidation, to produce the desired residual porosity.

The thermal expansion coefficient of NiO is significantly higher than that of yttria-stabilized zirconia and other cell materials. This difference in expansion can result in thermal stresses and cracking of the three-layer A/E/C and A/I/C composite tapes during co-firing if not adequately controlled. Reduction of the thermal expansion mismatch stresses in multilayer tapes to acceptable levels is achieved by any one of the following several approaches. A graded anode composition consisting of a 30 vol % Ni/70 vol % YSZ zone in contact with the YSZ electrolyte and a 50 vol % Ni/50 vol % YSZ zone at the outer surface is used to reduce the thermal expansion mismatch stresses. Another approach to reducing the thermal expansion mismatch makes use of a bimodal particle size distribution of YSZ powders in the anode formulation to introduce porosity and reduce modulus elasticity of the anode layer, thus reducing thermal expansion mismatch stresses during cooldown from the firing temperature. The bimodal size distribution is obtained by blending two zirconia powders to different starting particle sizes.

Intermediate bond coats applied by spraying are used to enhance the interfacial bonding between dissimilar materials. For example, to improve the bonding between $LaMnO_3$ cathode and YSZ electrolyte layers, a 50 vol % $LaMnO_3$/50 vol % YSZ bond coat is sprayed at the interface during fabrication of the multilayer tapes. A similar approach is used to enhance bonding at the interface between the NiO/YSZ anode and $LaCrO_3$ interconnection layers.

To facilitate lay-up of a monolithic multicell array, it is advantageous to provide means of bonding the corrugated and flat layers together without the use of pressure. Pressure bonding requires the use of mandrels or other mechanical fixtures temporarily inserted into the corrugated regions to prevent their collapse during the pressure bonding step. An unexpected result of the present invention is that pressureless bonding can be achieved by selection of the proper types and concentrations of binder and plasticizer. The preferred additives for pressureless bonding are a thermosetting acrylic resin such as Rohm and Haas Acryloid AT-51 and a butyl benzyl phthlate plasticizer such as Monsanto Santicizer 160. The acrylic resin is formulated as a solution of 50 wt % solids in 78 vol % xylene/22 vol % n-butanol solvent. Solid acrylic resin contents of 20-40 wt % relative to the ceramic powder are typically used. The plasticizer content is varied from 20-50 wt % relative to the solid acrylic resin content. The preferred binder and plasticizer contents for a given material are dependent on the characteristics of the starting ceramic powder, i.e., particle size distribution, surface area, and particle morphology. The specific formulations of ceramic slips are tailored to achieve the desired properties of tape flexibility, bonding behavior, firing shrinkage, porosity, and microstructure.

Incorporation of the appropriate concentrations of acrylic resin binder and plasticizer results in tapes which can be readily corrugated by warm molding or passing through corrugation rolls at temperatures of 40°-90° C. Upon cooling, the corrugated tapes retain their shape at room temperature and can be layered together with flat tapes of the other cell materials to form an array. The multilayered array can then be bonded together to form an integral structure by heating to 150° C. for 15-30 minutes to soften the plasticized binder and form a heat bond between the various layers. This heat bonding step can be accomplished without externally applied pressure. The acrylic resin is a hydroxyl-type thermosetting binder containing a nitrogen resin cross-linker, which causes thermosetting at the heat bonding/setting temperature of 150° C. The thermoset multilayer structure is then fired at 1200°-1600° C. to form the final fabricated monolithic fuel cell array. The thermoset resin provides structural integrity to the array during the early stages of organic burnout, i.e., up to 400° C., in the firing schedule.

AT-51 binder available from Rohm and Haas Co. is a thermosetting resin of the hydroxyl-type which contains a nitrogen resin cross linker. This binder is supplied as a 50 wt % solution 78 wt % xylene/22 wt % n-butanol and is diluted with the same solvent for formulation of tapes and spray coatings. The butyl benzyl phthlate ($C_{19}H_{20}O_4$) available from Monsanto as Santicizer 160 provides flexibility to the acrylic resin. The preferred dispersant is Solsperse 9000 available from ICI Americas and is an amine terminater polymer.

In one embodiment of the invention, the anode is formed by tape casting of an analyzed reagent grade nickel oxide powder produced by J. T. Baker and a $ZrO_2$-8 mol % $Y_2O_3$ powder produced by Toyo Soda. The Baker NiO powder consists of agglomerates and aggregates ranging in size up to ~50 micrometers and is made up of small primary particles within the agglomerates. The surface area of the as-received material was determined to be 4.6 $m^2$/g. This NiO powder is vibratory milled in methanol for 24 hours prior to tape casting to break up the large particles present in the as-received material. The vibratory milled NiO powder is dried in a porcelain tray and screened to −100 mesh for use as a tape casting raw material. The 24 hour vibratory milling treatment is effective in reducing the mean particle diameter to less than 1 micrometer. The Toyo Soda TZ-8Y yttria-stabilized zirconia powder consists of approximately spherical agglomerates which are broken down during ultrasonic treatment prior to particle size analyses. The surface area of the zirconia powder was determined to be 23 m$^2$/g.

In another approach, calcined anode powder was used as a means for controlling shrinkage behavior. The calcined anode material was prepared by mixing Zircar ZYP zirconia powder and Fisher nickel oxide in a ratio of 45 wt % nickel oxide. This results in an anode material with 30 vol. % Ni when the nickel oxide is reduced. Some of the anode slips used for multilayer casting of anode/interconnect/cathode composites were made with an addition of boric acid or boron oxide in order to curb the loss of sintering aid from the interconnect material via wicking across the contact points between the anode and interconnect. Fugitive pore formers are used as a means of tailoring the porosity in some of the tapes. Materials such as rice starch are burnt out during firing with minimal contamination to produce conductivity greater than 50 ohm$^{-1}$cm$^{-1}$ at 1000° C. and to provide a catalytic surface for the electrochemical reduction of oxygen.

In one embodiment, the p-type electronic conductor (La$_{0.89}$Sr$_{0.11}$) MnO$_3$ is used as the cathode material. Tape casting is used for fabricating thin layers of the cathode. Two different powder preparation techniques are used in preparing the LaMnO$_3$. One technique makes use of a citric acid-liquid mix process which yields relatively sinterable powders (designated as AT-type powders), while the other technique makes use of a solid-state reaction process which yields coarser, less sinterable materials designated as ALM-type powders.

The electrolyte slip is formulated in batches of approximately 80-100 grams of YSZ powder in polyethylene bottles of 250 cm$^3$ capacity. The milling media (calcia-stabilized zirconia cylinders) are placed in the bottle to about ⅓ to ½ the bottle volume, then the liquid components are added, generally in the order of least volatile to most volatile, and finally, the YSZ powder is added in about 3 to 4 increments with hand shaking of the slip between additions. The slip is then vibratory milled for 48 hours to assure adequate dispersion of the powder. Tape casting is preceded by a 10 minute ultrasonic treatment to coalesce small bubbles and a 1-minute vacuum outgasing to remove the bubbles. The electrolyte is tape cast in small batches directly on a glass surface using a doctor blade gap of 0.007 to 0.015 inches and a casting rate of 4 to 5 cm/s.

There has thus been shown a method for fabricating monolithic solid oxide fuel cell arrays formed of anode, electrolyte, cathode, and interconnection repeating units into a multilayer green body and co-firing this assembly into an integral, high strength, rigid structure. The individual cell materials are selected to have acceptably close coefficients of thermal expansion in order to minimize thermal expansion mismatch stresses during co-firing and cell operation. In addition to a close match of thermal expansion coefficients, effective lamination techniques are employed to ensure integrity of the interfacial bonds during fabrication and during thermal cycling in service. Furthermore, the sintering characteristics of the individual layers are tailored to match their linear shrinkage rates so that the multilayer composites remain flat during co-firing. In addition, the co-firing temperature is selected to provide adequate control of interdiffusion at the interfaces between neighboring layers. The process disclosed herein provides a multilayer, thin-walled cellular ceramic structure which is easily and inexpensively fabricated and is particularly adapted for use in high temperature monolithic solid oxide fuel cells.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for forming an SOFC comprising the steps of:
    dispersing each of four ceramic powders into respective ones of a plurality of liquid media to form four slips of an anode, a cathode, an electrolyte and an interconnect;
    milling a binder and a plasticizer into each of said four slips;
    casting the four slips into thin layers or tapes;
    forming a plurality of said tapes into a stacked array including the step of depositing an intermediate bonding layer between adjacent tapes, wherein said intermediate layers are comprised of portions of each of the adjacent layers between which the intermediate layer is disposed;
    forming a plurality of corrugations in the stacked array of tapes, wherein said corrugated stacked array is self-supporting; and
    heating the stacked array of tapes at an elevated temperature so as to increase the density of electrolyte and interconnect tapes, form bonds between adjacent tapes, and rigidify and increase the strength of the stacked array of tapes.

2. The method of claim 1 wherein the anode is selected from one of the class consisting of the combination Ni and yttria stabilized zirconia, and the combination Co and yttria stabilized zirconia.

3. The method of claim 2 wherein the cathode is comprised of strontium doped LaMnO$_3$.

4. The method of claim 3 wherein the electrolyte is comprised of yttria stabilized zirconia.

5. The method of claim 4 wherein the interconnect is comprised of magnesium doped LaCrO$_3$.

6. The method of claim 1 wherein the binder is selected from one of the class consisting of acrylics, vinyls, cellulosics, and other film-forming binders.

7. The method of claim 1 wherein the plasticizer is selected from one of the class consisting of phthalates, polyethylene glycol, and glycerol.

8. The method of claim 1 wherein the liquid medium is selected from one of the class consisting of organic solvents, a mixture of organic solvents, and water.

9. The method of claim 8 wherein said organic solvent is selected from one of the class consisting of alcohols, ketones, hydrocarbons, and chlorinated hydrocarbons.

10. The method of claim 1 further comprising the step of milling each slip to a paint-like consistency to break up powder agglomerates, to disperse the ceramic particles uniformly within the slip, and to homogenize the binder, the plasticizer and the dispersant.

11. The method of claim 10 further comprising the step of de-airing each of the slips prior to deposit onto a substrate.

12. The method of claim 11 wherein the step of de-airing each of the slips includes the step of ultrasonic agitating the slip in a partial vacuum.

13. The method of claim 1 wherein the step of forming the layers of anode, electrolyte, cathode, and interconnect includes tape casting with a doctor blade each of the slips into which a respective ceramic powder has been dispersed.

14. The method of claim 1 wherein the step of forming the layers includes spraying onto a substrate the slips into which a ceramic powder has been dispersed.

15. The method of claim 1 further comprising the step of adding a pore forming material to the cathode and anode slips.

16. The method of claim 15 wherein the pore forming material is selected from one of the class consisting of graphite, carbon black, rice starch, cornstarch, or other cellulosic derivative, wherein the pore forming material is removed during subsequent heating of the stacked array of tapes.

17. The method of claim 1 wherein the anode is comprised of Ni and yttria stabilized zirconia and the electrolyte is comprised of yttria stabilized zirconia, and wherein the intermediate layer disposed between the anode and electrolyte is comprised of 30 vol % Ni/70 vol % yttria stabilized zirconia in contact with the yttria stabilized zirconia electrolyte and a 50 vol % Ni/50 vol % yttria stabilized zirconia in contact with the anode.

18. The method of claim 1 wherein the anode is comprised of Co and yttria stabilized zirconia and the electrolyte is comprised of yttria stabilized zirconia, and wherein the intermediate layer disposed between the anode and electrolyte is comprised of 30 vol % Co/70 vol % yttria stabilized zirconia in contact with the yttria stabilized zirconia electrolyte and a 50 vol % Co/50 vol % yttria stabilized zirconia in contact with the anode.

19. The method of claim 1 wherein the cathode is comprised of strontium doped $LaMnO_3$ and the electrolyte is comprised of yttria stabilized zirconia, and wherein the intermediate layer disposed between the cathode and electrolyte is comprised of 50 vol % $LaMnO_3$/50 vol % yttria stabilized zirconia.

20. The method of claim 19 further comprising the step of spraying the intermediate layer on the interface between the cathode and electrolyte and on the interface between the anode and electrolyte.

21. The method of claim 1 wherein the anode is comprised of Ni and yttria stabilized zirconia and the interconnection is comprised of $LaCrO_3$, and wherein the intermediate layer between the anode and interconnection is comprised of 50 vol % $LaCrO_3$/50 vol % yttria stabilized zirconia.

22. The method of claim 1 wherein the anode is comprised of Co and yttria stabilized zirconia and the interconnection is comprised of $LaCrO_3$, and wherein the intermediate layer between the anode and interconnection is comprised of 50 vol % $LaCrO_3$/50 vol % yttria stabilized zirconia.

* * * * *